United States Patent
Langworthy et al.

(10) Patent No.: US 7,185,209 B2
(45) Date of Patent: Feb. 27, 2007

(54) END-TO-END RELIABLE MESSAGING WITH COMPLETE ACKNOWLEDGEMENT

(75) Inventors: David E. Langworthy, Kirkland, WA (US); Christopher G. Kaler, Sammamish, WA (US); Luis Felipe Cabrera, Bellevue, WA (US); Patrick J. Helland, Bellevue, WA (US); Steven E. Lucco, Bellevue, WA (US); John P. Shewchulk, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 709 days.

(21) Appl. No.: 10/446,448

(22) Filed: May 28, 2003

(65) Prior Publication Data

US 2004/0243800 A1 Dec. 2, 2004

(51) Int. Cl.
*G06F 1/24* (2006.01)

(52) U.S. Cl. ............... 713/193; 713/168; 713/182; 713/161

(58) Field of Classification Search ............. 713/182, 713/161, 168, 1.93
See application file for complete search history.

(56) References Cited

U.S. PATENT DOCUMENTS

| 6,073,165 | A | * | 6/2000 | Narasimhan et al. | ....... 709/206 |
| 6,138,146 | A | * | 10/2000 | Moon et al. | ................ 709/206 |
| 6,182,059 | B1 | * | 1/2001 | Angotti et al. | ................ 706/45 |

* cited by examiner

*Primary Examiner*—Thomas Peeso
(74) *Attorney, Agent, or Firm*—Workman Nydegger (57) ABSTRACT

Reliable end-to-end messaging in which tracking and acknowledgement information are contained in the electronic message that is visible to layers above the transport layer, thereby being independent of what transport protocols, and whether different transport protocols, are used to communicate between the two end points. Furthermore, acknowledgment messages may identify multiple ranges of sequence numbers corresponding to received electronic messages, thereby permitting further flexibility and completeness in acknowledging received messages.

9 Claims, 4 Drawing Sheets

END-TO-END RELIABLE MESSAGING WITH COMPLETE ACKNOWLEDGEMENT

BACKGROUND OF THE INVENTION

1. The Field of the Invention

The present invention relates to reliable network messaging. More particularly, the present invention relates to end-to-end reliable messaging that is independent of transport protocol and which may use complete acknowledgements.

2. Background and Related Art

Computing and networking technology has transformed the way we work and play. Networks have become so prolific that a simple network-enabled computing system may communicate with any one of millions of other computing systems spread throughout the globe over a conglomeration of networks often referred to as the "Internet". Such computing systems may include desktop, laptop, or tablet personal computers; Personal Digital Assistants (PDAs); telephones; or any other computer or device capable of communicating over a digital network.

In order to communicate over a network, one computing system (referred to herein as a "sending computing system") constructs or otherwise accesses an electronic message and transmits the electronic message over a network to another computing system (referred to herein as a "receiving computing system"). The electronic message may be read by a human user as when the electronic message is an e-mail or instant message, or may be read, instead, by an application running on the receiving computing system. The electronic message may be constructed by an application running on the sending computing system with the possible assistance of a human user.

Although such electronic messaging advantageously allows for computing systems to exchange information, networks sometimes fail to deliver an electronic message. Depending on the importance of the electronic message, this could be quite harmful, and even catastrophic in some cases. Accordingly, reliable electronic messaging technologies have been developed.

One reliable messaging technology is implemented at the transport layer in the form of acknowledgement messages. For example, Transmission Control Protocol (among other transport protocols) implements acknowledgement-based reliable messaging. Specifically, when a receiving computing system receives an electronic message from a sending computing system, the receiving computing system transmits an acknowledgement message to the sending computing system. Upon receipt of the acknowledgement message, the sending computing system may reliably take appropriate action given a knowledge that the receiving computing system did in fact receive the electronic message. Otherwise, if the sending computing system does not receive the acknowledgement message, the sending computing system may take appropriate action such as retransmitting the electronic message.

In order to reduce the number of acknowledgement messages that need to be transmitted, cumulative acknowledgement has been developed. In cumulative acknowledgement, the sending computing system assigns a sequence number to each electronic message in a session. The sequence number for a given electronic message is typically incremented by one as compared to the previous electronic message in the session. The cumulative acknowledgement returned to the sending computing system includes the last sequence number of a contiguous series of sequence numbers representing successfully received messages. For example, suppose the receiving computing system received electronic messages having sequence numbers 1 through 6, but not 7. The receiving computing system may return a cumulative acknowledgment identifying the sequence number 6.

One issue with cumulative acknowledgement is that, in the example, the sending computing system would not know anything about whether or not electronic messages having sequence numbers greater than 7 have been received. Accordingly, there is doubt as to the sending computing systems most appropriate action. For example, the sending computing system does not typically know whether it is a brief or more persistent network problem that caused the electronic message having sequence number 7 to be dropped. Accordingly, it is not clear whether the most appropriate action would be to retransmit electronic messages having sequence numbers greater than 7, or would be to retransmit just the electronic messaging having sequence number 7. An error in this judgment may cause unnecessary network bandwidth and processor usage and/or unnecessary delay.

Furthermore, the tracking and acknowledgment mechanism is specific to the transport protocol. In addition, many transport protocols do not allow for communication of tracking and acknowledgment information if the electronic message was to transition from one transport protocol to another. Accordingly, tracking and acknowledgment messages are not reliably communicated end-to-end between the sending computing system and the receiving computing systems.

Accordingly, what would be advantageous are reliable messaging in which acknowledgment message and tracking information is communicated even if multiple transport protocols are involved in messaging, and in which acknowledgment of the receipt of multiple electronic messages may be more fully communicated.

BRIEF SUMMARY OF THE INVENTION

The foregoing problems with the prior state of the art are overcome by the principles of the present invention which are directed towards a reliable end-to-end messaging mechanism. In particular, tracking and acknowledgement information is contained in the electronic message that is visible to layers above the transport layer, thereby being independent of what transport protocols, and whether different transport protocols, are used to communicate between the two end points.

The sending computing system constructs an outgoing electronic message and then includes tracking information in the electronic message. Then, the electronic message is passed to the transport layer with instructions to transmit the electronic message to a receiving computing system. If there are multiple hops in the routing path (i.e., multiple transport protocols are used during the coarse of the delivery), then the tracking information is preserved within the electronic message even when passing from one transport protocol to another in between hops.

At some point after receiving the outgoing electronic message, the receiving computing system constructs its own outgoing electronic message and includes acknowledgment of the received electronic message in that outgoing electronic message. The outgoing electronic message constructed by the receiving computing system may or may not be in response to the outgoing electronic message constructed by the sending computing system. The receiving computing system then passes the outgoing electronic message to the transport layer with instructions to transmit the electronic message to the sending computing system. Since the acknowledgment is embedded within the electronic message visible above the transport layer, the acknowledgment is received independent of the transport layer that is used to return the acknowledgment.

In accordance with another aspect of the present invention, the acknowledgment messages may identify multiple ranges of sequence numbers corresponding to received electronic messages. This permits further flexibility and completeness in acknowledging received messages. Accordingly, the sending computing system has better and more rapid knowledge of what has and has not been received. The sending computing system may thus more likely make better judgments based on that knowledge.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The principles of the present invention relate to reliable end-to-end messaging in which tracking and acknowledgement information are contained in the electronic message that is visible to layers above the transport layer, thereby being independent of what transport protocols, and whether different transport protocols, are used to communicate between the two end points. Furthermore, acknowledgment messages may identify multiple ranges of sequence numbers corresponding to received electronic messages, thereby permitting further flexibility and completeness in acknowledging received messages.

Embodiments within the scope of the present invention include computer-readable media for carrying or having computer-executable instructions or data structures stored thereon. Such computer-readable media can be any available media which can be accessed by a general purpose or special purpose computer. By way of example, and not limitation, such computer-readable media can comprise physical computer-readable media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, any instructions and data which cause a general purpose computer, special purpose computer, or special purpose processing device to perform a certain function or group of functions. The computer-executable instruction may be, for example, binaries, intermediate format instructions such as assembly language, or even source code. Although not required, the invention will be described in the general context of computer-executable instructions, such as program modules, being executed by computers in network environments. Generally, program modules include routines, programs, objects, components, data structures, etc. that perform particular tasks or implement particular abstract data types.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Figure 1:
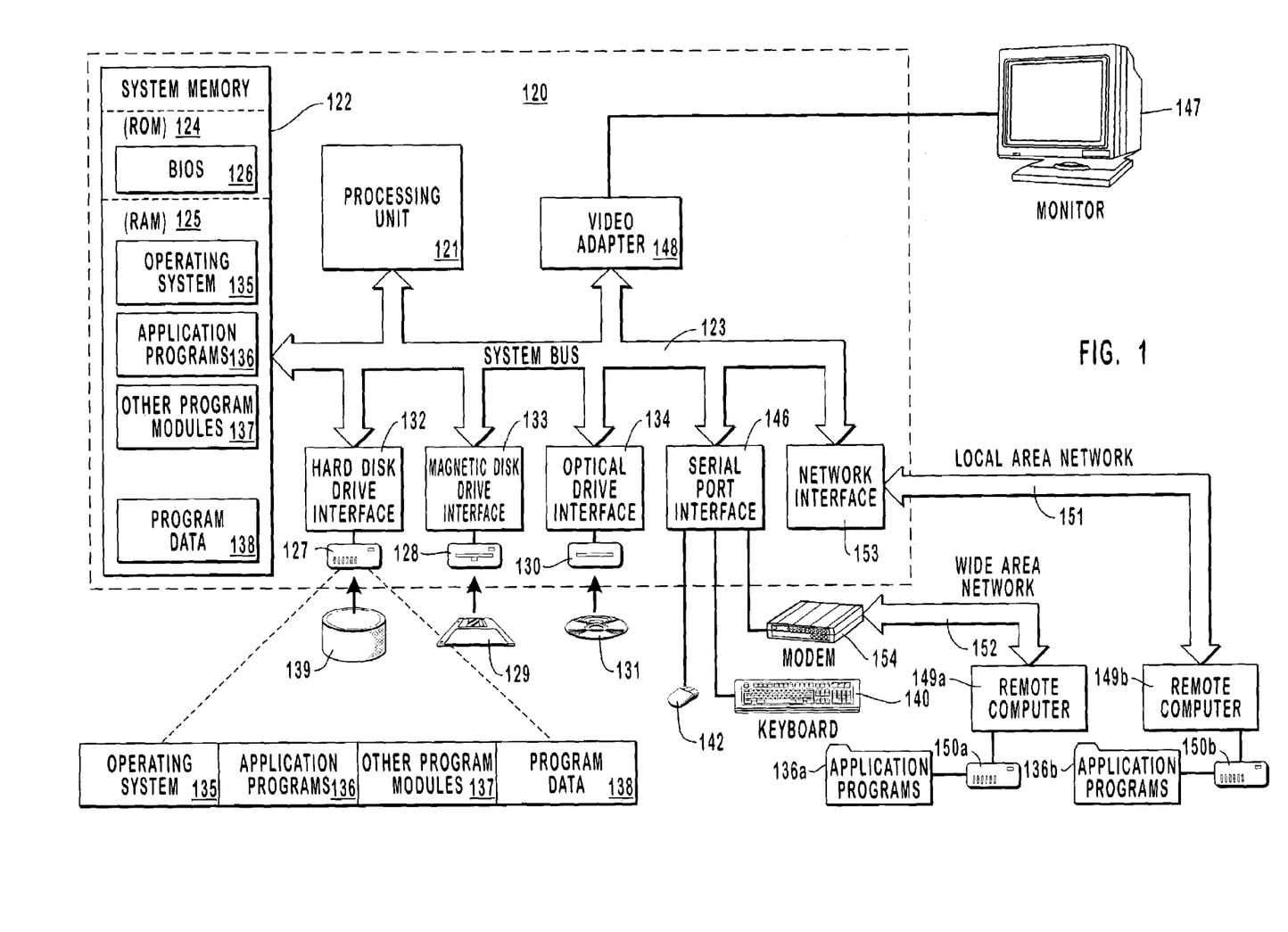
FIG. 1 illustrates a suitable computing system that may implement the features of the present invention.

FIG. 1 illustrates suitable computing environment in which the principles of the present invention may be employed in the form of a computer 120. The computer 120 includes a processing unit 121, a system memory 122, and a system bus 123 that couples various system components including the system memory 122 to the processing unit 121.

The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help transfer information between elements within the computer 120, such as during start-up, may be stored in ROM 124.

The computer 120 may also include a magnetic hard disk drive 127 for reading from and writing to a magnetic hard disk 139, a magnetic disk drive 128 for reading from or writing to a removable magnetic disk 129, and an optical disk drive 130 for reading from or writing to removable optical disk 131 such as a CD-ROM or other optical media. The magnetic hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer-executable instructions, data structures, program modules and other data for the computer 120. Although the exemplary environment described herein employs a magnetic hard disk 139, a removable magnetic disk 129 and a removable optical disk 131, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 139, magnetic disk 129, optical disk 131, ROM 124 or RAM 125, including an operating system 135, one or more application programs 136, other program modules 137, and program data 138. A user may enter commands and information into the computer 120 through keyboard 140, pointing device 142, or other input devices (not shown), such as a microphone, joy stick, game pad, satellite dish, scanner, or the like. These and other input devices are often connected to the processing unit 121 through a serial port interface 146 coupled to system bus 123. Alternatively, the input devices may be connected by other interfaces, such as a parallel port, a game port or a universal serial bus (USB). A monitor 147 or another display device is also connected to system bus 123 via an interface, such as video adapter 148. In addition to the monitor, personal computers typically include other peripheral output devices (not shown), such as speakers and printers.

The computer 120 may operate in a networked environment using logical connections to one or more remote computers, such as remote computers 149a and 149b. Remote computers 149a and 149b may each be another personal computer, a server, a router, a network PC, a peer device or other common network node, and typically include many or all of the elements described above relative to the computer 120, although only memory storage devices 150a and 150b and their associated application programs 136a and 136b have been illustrated in FIG. 1. The logical connections depicted in FIG. 1 include a local area network (LAN) 151 and a wide area network (WAN) 152 that are presented here by way of example and not limitation. Such networking environments are commonplace in office-wide or enterprise-wide computer networks, intranets and the Internet.

When used in a LAN networking environment, the computer 120 is connected to the local network 151 through a network interface or adapter 153. When used in a WAN networking environment, the computer 120 may include a modem 154, a wireless link, or other means for establishing communications over the wide area network 152, such as the Internet. The modem 154, which may be internal or external, is connected to the system bus 123 via the serial port interface 146. In a networked environment, program modules depicted relative to the computer 120, or portions thereof, may be stored in the remote memory storage device. It will be appreciated that the network connections shown are exemplary and other means of establishing communications over wide area network 152 may be used.

While FIG. 1 illustrates an example of a computing system that may implement the principles of the present invention, any computing system suitably programmed may implement the features of the present invention. In the description and in the claims, a "computing system" is defined broadly as any hardware component or components that are capable of using software to perform one or more functions. Examples of computing systems include desktop computers, laptop computers, Personal Digital Assistants (PDAs), telephones, or any other system or device that has processing capability.

The principles of the present invention enable reliable delivery of electronic messages in which two computing systems may have reliable tracking and acknowledgement end-to-end regardless of the transport protocol used to communicate between the two computing systems, and regardless of how many transport protocols are used in the communication. In this description and in the claims, the term "electronic message" means any message that may be communicated over a network and that may be communicated using a transport protocol.

Figure 2:
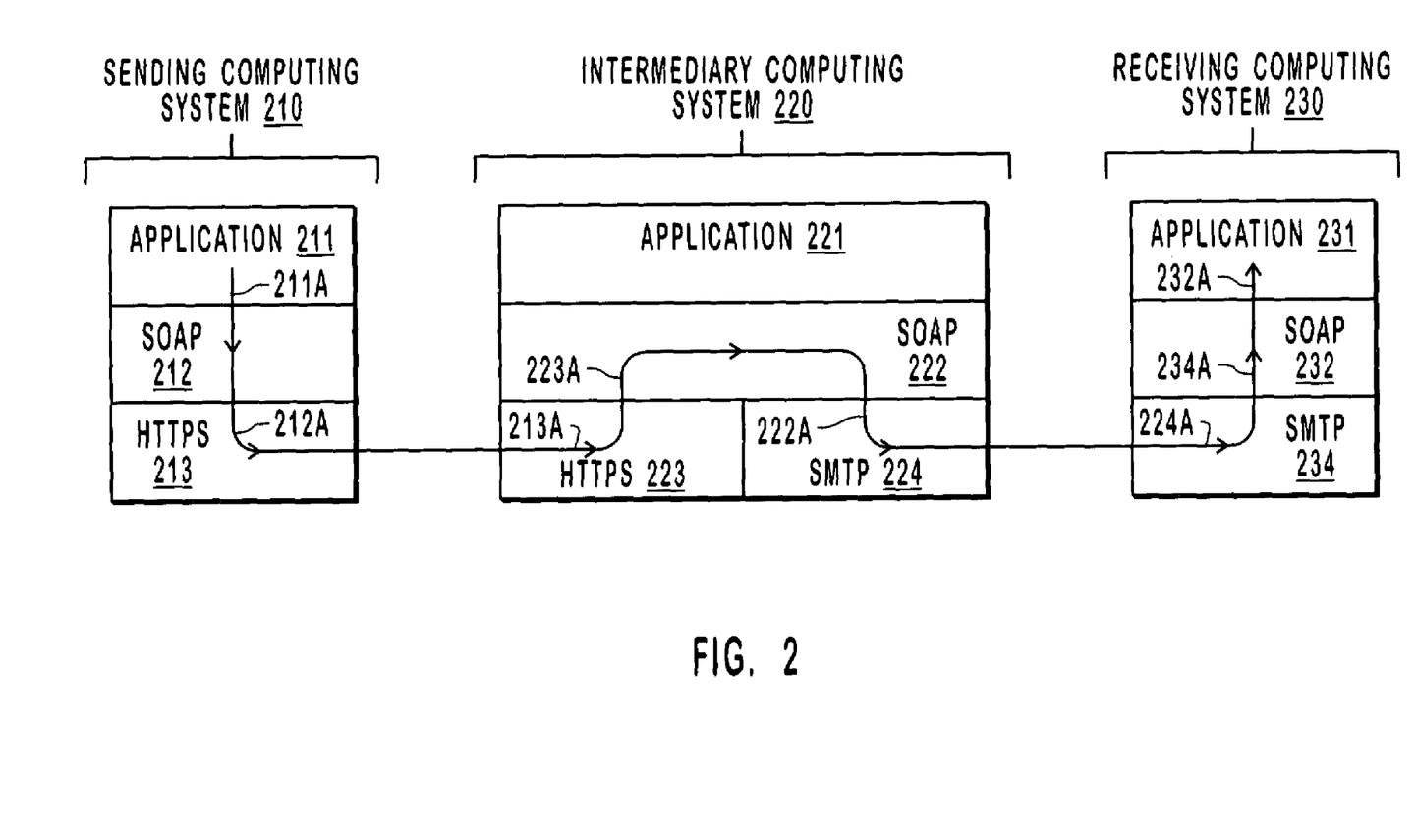
FIG. 2 illustrates a network environment in which the principles of the present invention may be employed.

For instance, FIG. 2 illustrates a conventional example in which two computing systems 210 and computing system 230 communicate via an intermediary computing system 220. In this description and in the claims, a "computing system" is defined as any hardware device or system that has at least one processor capable of accessing and executing instructions from a memory. An example of such a computing system is the computer 120 described above with respect to FIG. 1. The computing system 210 is referred to as a "sending" computing system since it sends an electronic message along the path illustrated by the extended arrow in FIG. 2. The computing system 230 is referred to as a "receiving" computing system since it receives the electronic message send along the path illustrated by the arrow in FIG. 2.

As represented by the arrow of FIG. 2, an application 211 at a sending computing system 210 is to send an electronic message to an application 231 at a receiving computing system 230. If the sending computing system 210 were structured as described above for the computer 120, then the application 211 would be one of application programs 136. Similarly, if the receiving computing system 230 were structured as described above for the computer 120, then the application 231 would be one of application programs 136.

In this example, the electronic message is transmitted as a Simple Object Access Protocol (SOAP) envelope. As is well known, SOAP envelopes may be transmitted over a number of transport protocols such as, for example, Hyper-Text Transport Protocol (HTTP), HTTP Secure (HTTPS), Simple Mail Transport Protocol (SMTP), User Datagram Protocol (UDP), Transmission Control Protocol (TCP), Bluetooth, or the like. The extended arrow in FIG. 2 represents a path that the electronic message takes from the sending computing system 210 to the receiving computing system 230.

In this example, the electronic message takes two hops, one from the sending computing system 210 to the intermediary computing system 220, and one from the intermediary computing system 220 to the receiving computing system 230. In this description and in the claims, a hop is defined to be that portion of a transmission path in which the electronic message is transmitted continuously using the same transport protocol. For example, the sending computing system 210 transmits the electronic message to the intermediary computing system 220 using HTTPS, while the intermediary computing system 220 transmits the electronic message to the receiving computing system 230 using SMTP.

Although FIG. 2 illustrates a network environment in which there are two distinct hops, the principles of the present invention still operate when there are more than two hops between the sending computing system 210 and the receiving computing system 230. Furthermore, although the transport protocols associated with the first and second hops are illustrated as being HTTPS and SMTP, respectively, the transport protocols may be any transport-level protocol.

Figure 3:
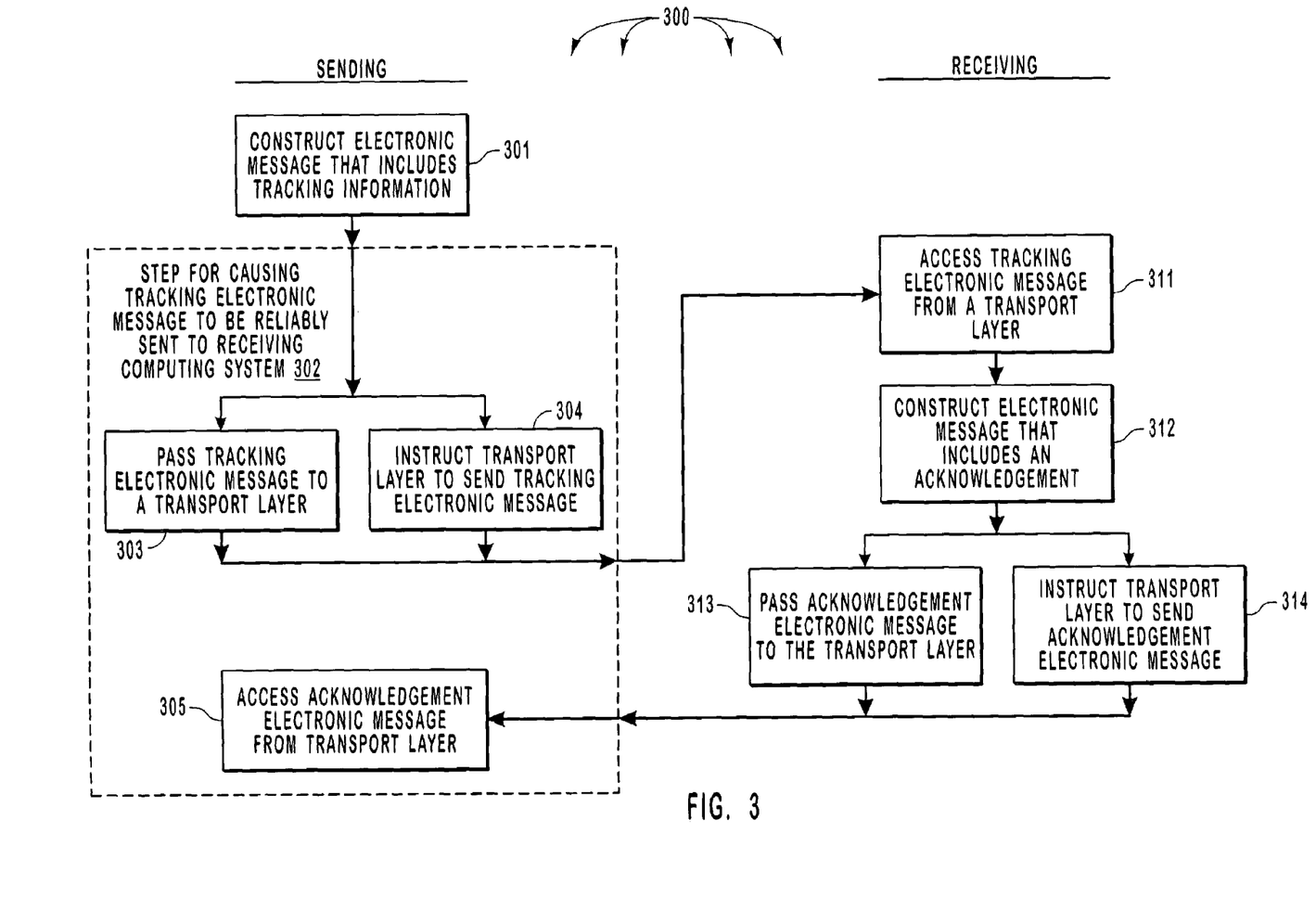
FIG. 3 illustrates a method for reliable messaging in accordance with the principles of the present invention.

FIG. 3 illustrates a flowchart of a method 300 for the sending computing system 210 reliably sending an electronic message to the receiving computing system 230 in a manner that is independent of what, or how many, transport protocols are used to transmit the electronic message. As the method 300 of FIG. 3 may be performed in the network environment of FIG. 2, the method will be described with frequent reference to both of FIGS. 2 and 3.

In FIG. 3, various acts and a result-oriented step are illustrated generally in the left column under the heading "SENDING", while various acts that are performed by the receiving computing system are illustrated generally in the right column under the heading "RECEIVING". Act that are illustrated in parallel represent that there is no time dependency as to which parallel act is performed first. For example, acts 303 and 304 may be performed at the same time, or one before or after the other. Similarly, acts 313 and 314 may be performed at the same time, or one before or after the other.

Figure 4:
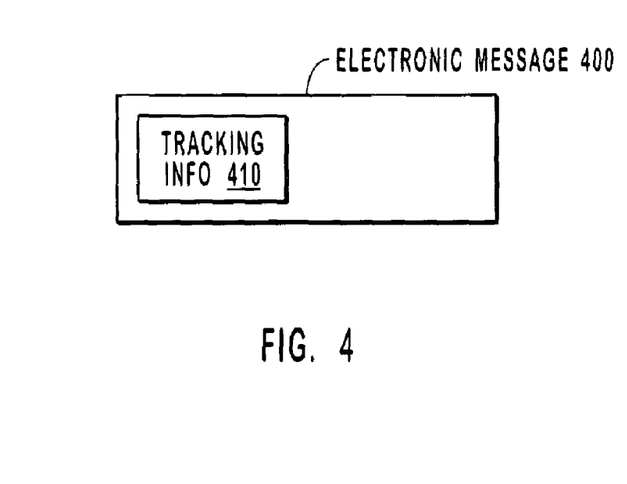
FIG. 4 illustrates a tracking electronic message data structure in which tracking information viewable above the transport layer is included.

The sending computing system constructs an outgoing electronic message that includes tracking information. That outgoing message will herein be referred to as a "tracking" electronic message though the electronic message may include far more than tracking information. FIG. 4 illustrates a data structure of an electronic message 400 that includes tracking information 410. The tracking information 410 may be signed and/or encrypted for security purposes. Although not required, in one embodiment, the tracking electronic message is in the form of a Simple Object Access Protocol (SOAP) envelope. However, the tracking electronic message may take other forms as well without restriction to any specific encoding. For example, the tracking electronic message may be consistent with EDS-style messages among participants.

Referring back to FIG. 2, the sending application 211 may generate the data to be included in the electronic message 211, along with optionally also the tracking information. The application then may pass the data (and potentially the tracking information) to the SOAP layer 212 as represented by arrow 21 1A. The SOAP layer 212 then composes the SOAP envelope with the tracking information. Optionally, some of all of the tracking information may be provided by the SOAP layer 212 instead of by the application 211.

As one of ordinary skill in the art will be aware, a SOAP envelope includes a header XML element and a body XML element. Each of the header and body elements may include a nested hierarchical tree of other XML elements. The element that includes the tracking information may appear as follows (line numbering has been added for clarity):

```
1.  <Session S:mustUnderstand="1">
2.     <SessionID URI=http://www.domainname.com/sessions/12334/>
3.     <Sequence>
4.        <Name> wsme:TargetTransmission </Name>
5.        <Value> 3 </Value>
6.     </Sequence>
7.  </Session>
```

Lines 1 through 7 represent a Session XML element that defines the tracking information. The Session XML element includes a Session ID XML element on line 2 that includes a session ID of 12334, and a Sequence XML element from lines 3 through 6 that has a sequence name of TargetTransmission and a sequence number of three. The session ID and sequence number in combination uniquely identifies the electronic message. Alternatively, a unique message identifier may be used instead.

Regardless of whether the tracking electronic message is a SOAP envelope, or some other type of electronic message, the sending computing system then performs a functional, result-oriented step for causing the outgoing electronic message to be reliably transmitted to the receiving computing system (step 302). This result-oriented step may be accomplished using any corresponding acts that accomplish this result. However, in the illustrated embodiment of FIG. 3, the step 302 includes corresponding acts 303, 304 and 305. The acts 303 and 304 are performed prior to the tracking electronic message being transmitted to the receiving computing system 230, while the final acts 305 in the step 302 is performed once an acknowledgment electronic message (described further below) is returned from the receiving computing system 230 to the sending computing system 210.

Specifically, the tracking electronic message with its included tracking information is passed to the transport layer associated with the sending computing system. The transport layer may implement any transport level protocol such as, for example, HTTPS, HTTP, SMTP, or the like. However, in the illustrated network environment of FIG. 2, the sending computing system 210 includes a transport layer 213 in the form of a HTTPS transport layer. Accordingly, in the example, the tracking electronic message is passed to the HTTPS transport layer 213.

The sending computing system 210 passes the tracking electronic message with the included tracking information to the transported layer 213 as represented by arrow 212A (act 303), and instructs the transport layer 213 to send the tracking electronic message to the receiving computing system 230 (act 304). The transport layer 213 communicates the tracking electronic message, along with any transport level information, to a corresponding transport layer 223 at the intermediary computing system 220 as represented by arrow 213A. This completes the first hop in which the transport layers that transport the electronic message follow the same transport protocol (in this case, HTTPS).

In order to continue the transmission to another hop in which a different transport protocol (in this case, SMTP), the transport level header information is stripped from the electronic information and the electronic message is passed to an upper layer (in this case, SOAP layer 222) of the intermediary computing system 220 as represented by arrow 223A. Conventionally, tracking information is included within the transport level header information. Accordingly, the SOAP layer 222 at the intermediary computing system would not have access to the tracking information and thus could not pass the tracking information to future hops if conventional transport level tracking was employed. This would result in failure of reliability in messaging. In accordance with the principles of the present invention, however, the tracking information is included in the electronic message as it is visible to layers above the transport layer. For instance, the SOAP layer can view the entire SOAP envelope, and thus would have access to the tracking information.

SOAP is a protocol that resides above the transport layer and works across a variety of different transport protocols. Accordingly, the SOAP layer 222 may pass the tracking electronic message with the tracking information to the transport layer of a different transport protocol such as, for example, the SMTP transport layer 224 as represented by arrow 222A. The transport layer 224 delivers the tracking electronic message to the corresponding transport layer 234 at the receiving computing system 230 as represented by arrow 224A. In this case, since the transport layer 224 follows the SMTP protocol, the transport layer 234 also follows the SMTP protocol.

The transport layer 234 strips any transport level information and then passes the tracking electronic message to a SOAP layer 232 as represented by arrow 234A. Accordingly, the receiving computing system 230 accesses the tracking electronic message from the transport layer 234 (act 311). The SOAP layer 232 may optionally pass the tracking electronic message (or any interesting content) to the application 231 as represented by arrow 232A.

The receiving layer then constructs an outgoing electronic message that includes an acknowledgement that the receiving computing system received the incoming electronic message (act 312). The acknowledgement may be signed and/or encrypted for security. This outgoing electronic message will be referred to as an "acknowledgment" electronic message, although the electronic message may include much more information that just an acknowledgement. The acknowledgement may be sent as an independent stand alone message. Alternatively, the acknowledgment may be included as additional metadata (piggybacked) on a separate electronic message. That message may be a response to the tracking electronic message or entirely unrelated to the content within the tracking electronic message.

The following illustrates an acknowledgement in the form of an XML element (line numbers are added for clarity). The acknowledgement as follows is just one example of a potential encoding of acknowledgement information. Other analogous encoding of the acknowledgement is also anticipated as being within the scope of the principles of the present invention.

```
1.   <Session S:mustUnderstand="1">
2.     <SessionID URI=http://www.domainname.com/sessions/12334/>
3.     <Sequence>
4.       <Name> wsme:InitiatorTransmission </Name>
5.       <Value> 35 </Value>
6.     </Sequence>
7.     <Acknowledgment>
8.       <Name> wsme: TargetTransmission </Name>
9.       <Value> 3 </Value>
10.    </Acknowledgment>
11.  </Session>
```

The Session XML element defined from lines 1 through 11 includes an Acknowledgment XML element from lines 7 through 10. Line 9 identifies the acknowledgement is for the transmission having sequence number 3 (i.e., the original tracking electronic message). In this case, the acknowledgment electronic message may be a distinct electronic message having its own tracking information. Lines 2 through 6 define this tracking information in the form of a session identifier and sequence number.

Note how in the case of the acknowledgment electronic message, the receiving computing system 230 acts as a sending computing system for the electronic message identified in the tracking information, while the sending computing system 210 acts as the receiving computing system. Accordingly, the use of the term "sending" for the sending computing system 210, and "receiving" for the receiving computing system 230, should not be construed as meaning that all communications are from the sending computing system to the receiving computing system. On the contrary, communications between the sending computing system 210 and the receiving computing systems 230 may be bi-directional.

After the receiving application 231 or the SOAP layer 232 constructs the acknowledgement electronic message, the receiving computing system 230 passes the acknowledgment electronic message with the included acknowledgement to the transport layer 234 (act 313) along with instruction to send the acknowledgment electronic message to the sending computing system 210 (act 314). As the acknowledgement information is visible to layers above the transport layer, the acknowledgement information is successfully preserved all through the return path even though multiple transport protocols are used in the return transmission. The sending computing system 210 then receives the acknowledgement message, and then upper layers of the sending computing system 210 access the acknowledgment electronic message from the transport layer 213 (act 305).

Figure 5:
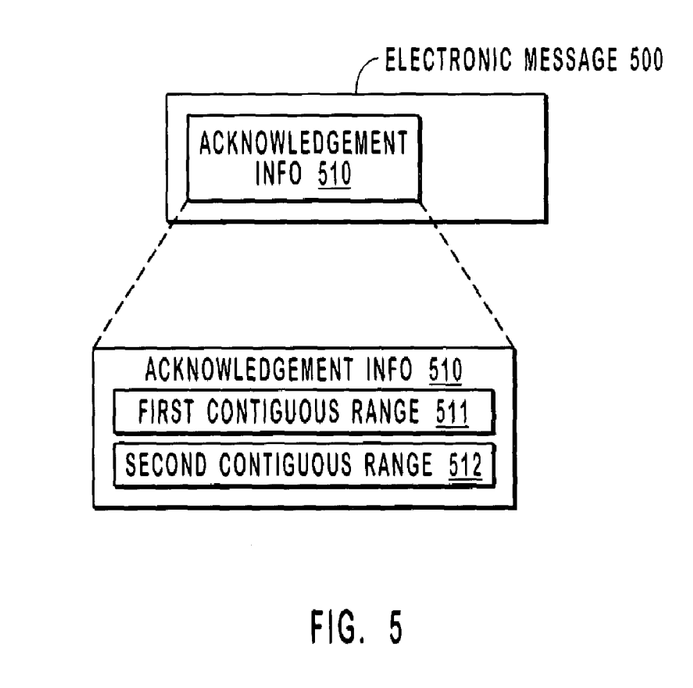
FIG. 5 illustrates an acknowledgement electronic message data structure in which acknowledgement information viewable above the transport layer is included, the acknowledgment information optionally including acknowledgment of multiple discontiguous ranges.

FIG. 5 illustrates a data structure of an acknowledgement message 500 in accordance with the principles of the present invention. The acknowledgment message 500 includes acknowledgment information 510. Optionally, the acknowledgement message 500 includes a range of electronic messages that are being acknowledged. The following illustrates an example of an XML element that includes such an acknowledgment (line numbers are added for clarity):

```
1.   <Session S:mustUnderstand="1">
2.     <SessionID URI=http://www.domainname.com/sessions/12334/>
3.     <Sequence>
4.       <Name> wsme:InitiatorTransmission </Name>
5.       <Value> 35 </Value>
6.     </Sequence>
7.     <Acknowledgment>
8.       <Name> wsme: TargetTransmission </Name>
9.       <Range> Range Upper="23" Lower="1"/>
10.    </Acknowledgment>
11.  </Session>
```

This Session XML element is similar to the previous example Session XML element, except for line 9. Line 9 represents that all 23 electronic message ranging from sequence number 1 to sequence number 23 for a particular session are being acknowledged as being received by the receiving computing system 230.

As represented in FIG. 5, the acknowledgement information 510 could also identify multiple ranges, each being discontiguous with other expressed ranges. For example, the acknowledgment information 510 includes two ranges, a first contiguous range 511 and a second contiguous range 512. The following illustrates an XML Session element in which multiple contiguous ranges are specified (line number is added for clarity):

```
1.   <Session S:mustUnderstand="1">
2.     <SessionID URI=http://www.domainname.com/sessions/12334/>
3.     <Sequence>
4.       <Name> wsme:InitiatorTransmission </Name>
5.       <Value> 35 </Value>
6.     </Sequence>
7.     <Acknowledgment>
8.       <Name> wsme: TargetTransmission </Name>
9.       <Range> Upper="23" Lower="1"/>
10.      <Range> Upper="32" Lower="26">
11.    </Acknowledgment>
12.  </Session>
```

This Session XML element is similar to the previous example Session XML element except that an additional range is included at line 10. This acknowledgment message acknowledges receipt of all session electronic messages having sequence numbers 1 through 23 and 26 through 32. Note how the sequence numbers 24 and 25 are not acknowledged. By including further ranges as needed, a single acknowledgment message can completely express acknowledgments of all electronic message received to date in the session.

Allowing such a complete acknowledgment permits for a single acknowledgment electronic message to acknowledge receipt of a range of electronic message even if there are gaps in that range due to some of the electronic messages not being received. Furthermore, the complete expression of acknowledgment allows for failure recovery. For example, suppose that the receiving computing system 230 were to fail mid-session and thereby lose one or more electronic message that it had previously received relating to that session. Upon recovery, the next time the receiving computing system 230 receives an electronic message for that session, the receiving computing system 230 may acknowledge a comprehensive list of all electronic messages that it has received and has access to. The sending computing system 210 may determine from this complete acknowledgement that the receiving computing system 230 does not have access to some electronic message even though it had previously acknowledged receipt of those messages. Accordingly, the sending computing system 210 may retransmit those previously acknowledged electronic messages to the receiving computing system 230, thereby assisting the receiving computing system 230 in recovering from failure.

Likewise, the sending computing system 210 may fail mid-session thereby losing track of which electronic messages the receiving computing system 230 had previously acknowledged. The next acknowledgment message from the receiving computing system 230 will bring the sending computing system 210 back into full knowledge of the set of electronic messages received by the receiving computing system 230.

The expression of multiple ranges in the context of an XML element that may be expressed in a SOAP envelope allows for such complete acknowledgment in an end-to-end communication that requires multiple transport protocols, the expression of ranges may also be included in other layers of the protocol stack. This would still allow for the flexible expression of discontiguous ranges and robust failure recovery just described, even if reliable end-to-end communication was not enabled for multiple hop communications.

Accordingly, the principles of the present invention allow for reliable end-to-end communication even if multiple hops and transport protocols are needed to complete the communication. Furthermore, the acknowledgment of receipt may be flexibly defined using multiple discontiguous ranges thereby facilitating a complete acknowledgment that facilitates failure recovery.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed is:

1. In a network environment that includes a plurality of computing systems that operate using a plurality of different transport protocols, the plurality of computing systems including a sending computing system capable of transmitting electronic messages and a receiving computing system capable of receiving electronic messages transmitted by the sending computing systems, a method for the sending computing system reliably sending an electronic message to the receiving computing system in a manner that is independent of what, or how many, transport protocols are used to transmit the electronic message, the method comprising the following:

an act of the sending computing system constructing an outgoing electronic message that includes tracking information that uniquely identifies the outgoing electronic message;

an act of passing the outgoing electronic message with the included tracking information to a transport layer associated with the sending computing system;

an act of instructing the transport layer to send the outgoing electronic message to the receiving computing system; and an act of accessing an incoming electronic message from the transport layer, the incoming electronic message originating from the receiving computing system and including an acknowledgement that the receiving computing system received the outgoing electronic message;

wherein the outgoing electronic message and the incoming electronic message are each Simple Object Access Protocol (SOAP) envelopes.

2. A method in accordance with claim 1, wherein the transport layer is a HyperText Transport Protocol (HTTP) layer.

3. A method in accordance with claim 1, wherein the transport layer is a HyperText Transport Protocol Secure (HTTPS) layer.

4. A method in accordance with claim 1, wherein the transport layer is a Simple Mail Transport Protocol (SMTP) layer.

5. In a network environment that includes a plurality of computing systems that operate using a plurality of different transport protocols, the plurality of computing systems including a sending computing system capable of transmitting electronic messages and a receiving computing system capable of receiving electronic messages transmitted by the sending computing systems, a method for the sending computing system reliably sending an electronic message to the receiving computing system in a manner that is independent of what, or how many, transport protocols are used to transmit the electronic message, the method comprising the following:

an act of the sending computing system constructing an outgoing electronic message that includes tracking information that uniquely identifies the outgoing electronic message;

an act of passing the outgoing electronic message with the included tracking information to a transport layer associated with the sending computing system;

an act of instructing the transport layer to send the outgoing electronic message to the receiving computing system; and an act of accessing an incoming electronic message from the transport layer, the incoming electronic message originating from the receiving computing system and including an acknowledgement that the receiving computing system received the outgoing electronic message;

wherein the acknowledgement in the incoming message acknowledges receipt of a plurality of electronic message received from the sending computing system using a plurality of ranges.

6. A computer program product for use in a network environment that includes a plurality of computing systems that operate using a plurality of different transport protocols, the plurality of computing systems including a sending computing system capable of transmitting electronic messages and a receiving computing system capable of receiving electronic messages transmitted by the sending computing systems, the computer program product for implementing a method for the sending computing system reliably sending an electronic message to the receiving computing system in a manner that is independent of what, or how many, transport protocols are used to transmit the electronic message, the computer program product comprising one or more computer-readable media having thereon computer-executable instructions that, when executed by one or more processors of the sending computing system, cause the sending computing system to perform the following:
- an act of the sending computing system constructing an outgoing electronic message that includes tracking information that uniquely identifies the outgoing electronic message;
- an act of passing the outgoing electronic message with the included tracking information to a transport layer associated with the sending computing system;
- an act of instructing the transport layer to send the outgoing electronic message to the receiving computing system; and
- an act of accessing an incoming electronic message from the transport layer, the incoming electronic message originating from the receiving computing system and including an acknowledgement that the receiving computing system received the outgoing electronic message;
- wherein the one or more computer-readable media further have thereon computer-executable instructions that, when executed by the one or more processors at the sending computing system, cause the sending computing system to sign the tracking information in the outgoing electronic message.

7. A computer program product for use in a network environment that includes a plurality of computing systems that operate using a plurality of different transport protocols, the plurality of computing systems including a sending computing system capable of transmitting electronic messages and a receiving computing system capable of receiving electronic messages transmitted by the sending computing systems, the computer program product for implementing a method for the sending computing system reliably sending an electronic message to the receiving computing system in a manner that is independent of what, or how many, transport protocols are used to transmit the electronic message, the computer program product comprising one or more computer-readable media having thereon computer-executable instructions that, when executed by one or more processors of the sending computing system, cause the sending computing system to perform the following:
- an act of the sending computing system constructing an outgoing electronic message that includes tracking information that uniquely identifies the outgoing electronic message;
- an act of passing the outgoing electronic message with the included tracking information to a transport layer associated with the sending computing system;
- an act of instructing the transport layer to send the outgoing electronic message to the receiving computing system; and
- an act of accessing an incoming electronic message from the transport layer, the incoming electronic message originating from the receiving computing system and including an acknowledgement that the receiving computing system received the outgoing electronic message;
- wherein the one or more computer readable media further have thereon computer-executable instructions that, when executed by the one or more processors at the sending computing system, cause the sending computing system to encrypt the tracking information in the outgoing electronic message.

8. In a network environment that includes a plurality of computing systems that operate using a plurality of different transport protocols, the plurality of computing systems including a sending computing system capable of transmitting electronic messages and a receiving computing system capable of receiving electronic messages transmitted by the sending computing systems, a method for the sending computing system reliably sending an electronic message to the receiving computing system in a manner that is independent of what, or how many, transport protocols are used to transmit the electronic message, the method comprising the following:
- an act of the sending computing system constructing an outgoing electronic message that includes tracking information that uniquely identifies the outgoing electronic message; and
- a step for causing the outgoing electronic message to be reliably transmitted to the receiving computing system.

9. A method in accordance with claim 8, wherein the step for causing the electronic message to be reliably transmitted to the receiving computing system comprises the following:
- an act of passing the outgoing electronic message with the included tracking information to a transport layer associated with the sending computing system;
- an act of instructing the transport layer to send the outgoing electronic message to the receiving computing system; and
- an act of accessing an incoming electronic message from the transport layer, the incoming electronic message originating from the receiving computing system and including an acknowledgement that the receiving computing system received the outgoing electronic message.

* * * * *